March 11, 1958 L. W. PARKER 2,826,633
INTERCARRIER TELEVISION RECEIVERS
Filed Oct. 3, 1952
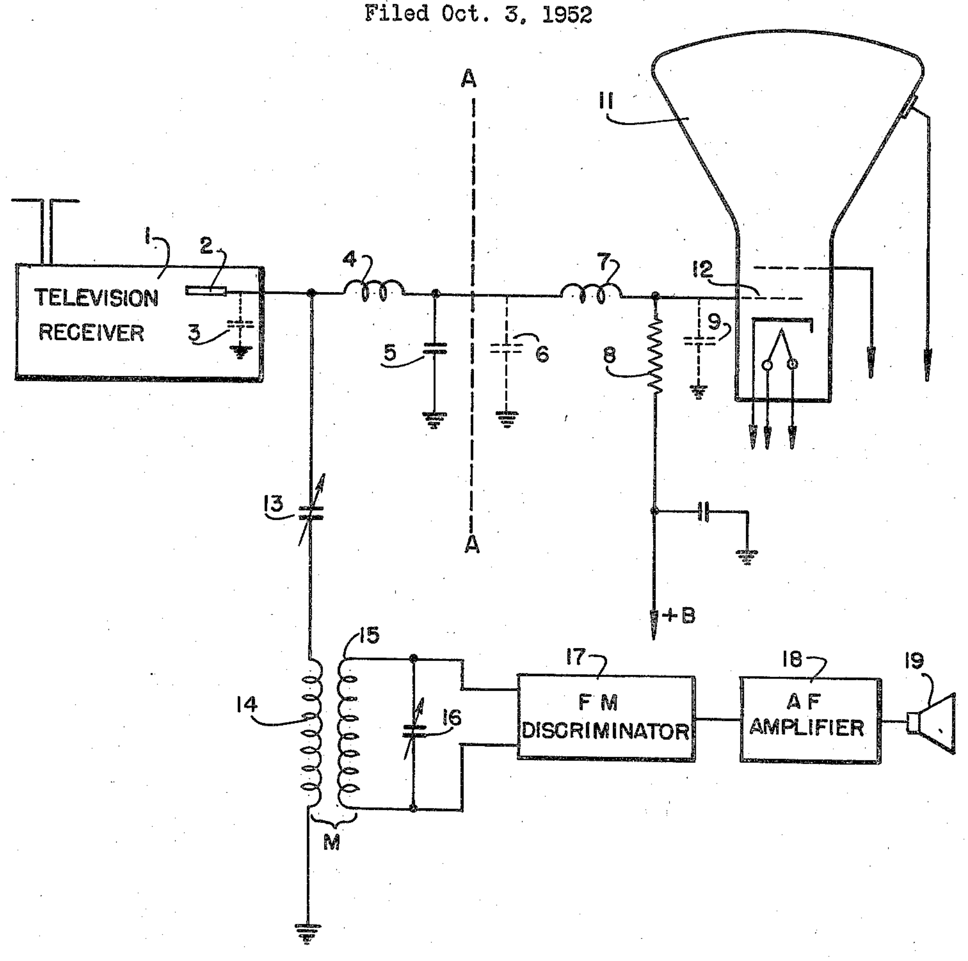
INVENTOR
LOUIS W. PARKER 2,826,633

INTERCARRIER TELEVISION RECEIVERS

Louis W. Parker, Great Neck, N. Y.

Application October 3, 1952, Serial No. 312,981
8 Claims. (Cl. 178—5.8)

This invention relates to television receivers of the type using the intercarrier sound systems and more particularly to arrangements for feeding currents from the final video amplifier to the picture tube and to the sound system carrier to feed the frequency discriminator in such receivers.

The principles of intercarrier sound systems are well known in the art, one description of them may be found in my U. S. Patent #2,448,908. For this reason there will be no discussion of these principles in the following specifications. The term "intercarrier frequency" as will be used in the specification and claims is intended to designate the beat frequency between picture and sound carriers. According to present standards of the Federal Communications Commission this frequency difference is 4.5 megacycles. Should these standards be changed by specifying a different carrier frequency spacing the term "intercarrier frequency" will designate the new frequency difference between the picture and sound carriers.

Various circuits have been proposed and used in the past to extract the intercarrier frequency from the video frequency signals of television receivers. Most of these circuits were successful to a limited degree but they all had the disadvantage of either supplying too low output voltage or introducing a video frequency amplitude modulation into the intercarrier frequency or both.

One object of this invention is to provide a method for extracting the intercarrier frequency from the output of an intercarrier type of television receiver in such manner that the voltage so obtained is of great enough magnitude to feed directly to most types of frequency discriminators, eliminating the necessity of intercarrier frequency amplification.

Another object of this invention is to provide an intercarrier type of television receiver in which a large amount of power at intercarrier frequency is extracted from the final video amplifier and used to develop sound signals, without in any way disturbing the normal functioning of the final video frequency amplifier.

A still further object of my invention is to reduce the disturbing effect of the intercarrier frequency on the reproduced picture.

Other additional objects will be apparent from the specification that follows.

Yet another object of the invention is to eliminate the effects of high capacity loading of the video amplifier by the discriminator.

In practicing the preferred embodiment of my invention, I make use of the fact that certain types of conventional video peaking systems represent a very high impedance at 4.5 magacycles which is, of course, the center of the frequency modulated intercarrier frequency. I shunt this 4.5 mc. signal to ground thru a low impedance series resonant circuit. The condenser of this series resonant circuit has a very low value so as not to disturb the normal functioning of the video amplifier. However, inasmuch as the series resonant circuit is tuned to the intercarrier frequency its impedance to signals at that frequency is quite low and the magnetic field created by the coil is of considerable magnitude. A parallel resonant circuit has a condenser of larger capacity than the condenser of the series resonant circuit and also has a coil inductively coupled to the coil of the series resonant circuit. A discriminator having appreciable input capacity is connected in parallel with the parallel resonant circuit, but this comparatively high capacity no longer has an adverse effect on the high frequency response of the video amplifier. The R. F. voltage obtained across this second resonance circuit is higher than obtainable across the first mentioned resonance circuit.

The single figure of the drawing is a schematic diagram of one form of my invention.

Referring first to the old elements of the circuit it will be seen that a conventional intercarrier television receiver 1 is supplying video signals to cathode ray tube 11 thru a so called double $\pi$ filter coupling network, made up of elements 3, 4, 5, 6, 7, 8 and 9. The plate of the last video amplifier tube 2 is shown in block 1 in order to designate the fact that the above filter coupling is connected to that plate. All the elements involved in television receiver 1 and cathode ray tube 11, as well as the functioning of these units are conventional, therefore require no further illustration or discussion.

The filter which couples the anode 2 of the video amplifier to the cathode ray tube uses two coils 4 and 7 in series and three condensers 3, 5, and 9, the middle one of which, 5 has twice the capacity value of the end ones 3 and 9. The load resistor 8 of the filter is also the plate resistor of tube 2.

In some cases a similar circuit is used which is generally spoken of as shunt series peaking. In such instances the capacity of the cathode ray tube input is connected in parallel with condenser 5 eliminating in this way its loading effect. In addition to this alternate form of shunt series peaking there are still other forms. The values of the inductive, capacitive and resistive elements are usually determined by different formulae in this alternate form of peaking than with the filter arrangement shown in the drawing. In certain claims, I stress the inductive relation of coils 14 and 15 along with other elements. So far as this phase of my invention is concerned any form of peaking is useful for my invention as long as it represents a high impedance at 4.5 mc. looking from the plate of the last video amplifier. Another form of such peaking useful with my invention is the conventional series peaking circuit.

A practical advantage inherent in the peaking shown in the drawing is the fact that it is possible to place the comparatively high capacity of the lead connecting the control electrode 12 of the cathode ray tube 11 to the video amplifier 2 into the middle of the two section filter. Usually the connections to the video amplifier and peaking circuits are below the metal chassis, while the connection to the cathode ray tube is above the chassis. A long lead is necessary to connect the two which adds to the capacities in the circuit. On the drawing dotted line A—A represents the chassis, the left side of the line being below, the right side above the chassis. Coil 4 is below, while coil 7 is above the chassis preferably right next to the control electrode 12 of cathode ray tube 11. In this way the capacity loading caused by the long connecting line between coils 4 and 7 is eliminated. In practice it was found advisable to add condenser 5 to increase this capacity to twice the value of those on each end of the filter. The cut off frequency of the filter was made 4 megacycles in order to pass the high video frequencies, but attenuate the 4.5 mc. intercarrier frequency.

A further attenuation of the intercarrier frequencies was accomplished by series resonance circuit 13, 14. This circuit represents a low impedance path to 4.5 mc. where it is tuned. As far as the filter coupling 3, 4, 5, 6, 7, 8 and 9 is concerned, it represents a resistance at 4.5 mc. and a low capacity condenser for video frequencies. In order not to increase the inherent capacity too much at plate 2, the value of condenser 13 is made low (5 to 10 mmf.). It may be variable as shown or fixed and the inductance of coil 14 varied with a "slug." This resonant coil 14 has a comparatively high inductance necessitated by the very low capacity in series with it. When operating a high R. F. voltage is developed across it, however if any appreciable capacity is added across this coil, the voltage is greatly reduced. For this reason another coil 15 is placed in inductive relation to coil 14 and resonated by condenser 16 at 4.5 megacycles. This condenser may be variable from 5 to 25 mmf. The discriminator 17, such as for example a 6BN6 tube is placed across condenser 16 and the capacity so added is then removed from condenser 16.

I have discovered that the voltage across coil 15 can be higher than across coil 14 in spite of the greater magnitude of tuning capacity across coil 15. In addition the signal is freer from video frequencies, which have a tendency to leak thru. I am aware of the fact that series resonant circuits like shown at 13—14 were used in the past for a similar purpose, but the signal voltage was taken off directly across the coil, also no attention was paid to the type of peaking used with the circuit. By introducing my improvements as shown on the drawing a voltage increase of several fold is obtained. In one experimental set up I measured 66 volts R. M. S. at 4.5 mc. across coil 15 while receiving a normal picture. The capacities of discriminator 17 and condenser 16, of course, do not effect the high frequency response of the video amplifier in receiver 1. It may also be mentioned that practically all the energy available in coil 14 can be extracted by properly coupling to it resonance circuit 15—16.

By using the circuit shown on the figure the entire sound reproduction system of a television receiver may contain only one 6BN6 discriminator followed by a one tube audio amplifier and speaker. These parts are designated on the drawing as 17, 18 and 19 respectively. The invention may also be used in conjunction with other forms of discriminators such as my one tube discriminator described in my U. S. patent Ser. No. 252,783, filed October 23, 1951, entitled Frequency Discriminator in which case only one tube is necessary for the entire sound system in the television receiver.

I found it desirable to couple resonant circuit 13—14 to the plate of the last video amplifier, since at this point the greatest amount of 4.5 mc. energy is available. It is possible of course to couple to the plate of the first video frequency amplifier or to any other portion of the circuit containing the 4.5 megacycle signal. Care must be taken however not to overload the video amplifier tube either by the video frequency signals or by the 4.5 mc. since otherwise intermodulation will result.

Due to the highly effective filtering of the 4.5 mc. component from the picture, I found it possible to use less than usual attenuation for the sound component in the intermediate frequency amplifier of the superheterodyne receiver. This can be adjusted by increasing slightly the band pass of these amplifier stages. The band pass of these amplifier stages should not, however, be increased to such an extent that some of the amplitude modulation (due to the video signals) be transferred to the frequency modulated sound signals. In some forms of discriminators more amplitude modulation is permitted than in others, the consideration of this is the governing parameter of the degree of sound signal attenuation required in the I. F. stages.

On the drawing the control electrode 12 of cathode ray tube 11 is shown connected to the plate 2 of the video amplifier thru coils 4 and 7, there being no provision to eliminate the D. C. plate voltage from this element. Such method is often used, but if desired a condenser resistor combination may be substituted as done sometimes in the art. The method used does not form part of the invention and is not described here in detail.

While I have shown and described one embodiment of my invention, it will be understood that modifications and changes may be made without departing from the spirit and scope thereof, as will be clear to those skilled in the art.

In this application I have particularly pointed out and distinctly claimed the part, improvement or combination which I claim as my invention or discovery, and I have explained the principles thereof and the best mode in which I have contemplated applying those principles so as to distinguish my invention from other inventions.

What I claim:

1. In a television receiver of the intercarrier type; means including an amplifier for producing a wide band video signal and a frequency modulated sound carrier whose frequency band falls outside that of the video signal band; a picture tube; means, connecting said amplifier to the picture tube, which includes means for attenuating the frequency modulated signal to prevent it from distorting the picture; means connected across the output of said amplifier which offers high impedance to frequencies within said video band and low impedance to the frequency modulation signals including a series resonant circuit having a condenser and a coil in series with each other; said series resonant circuit being tuned to a frequency within the band of the frequency modulated signals; a parallel resonant circuit tuned to substantially the same frequency as the resonant frequency of the series resonant circuit; said parallel resonant circuit comprising a coil and a condenser; said coils being in inductive relation with each other; and means for demodulating the frequency modulated signals appearing in said resonant circuit.

2. A television receiver as defined in claim 1 in which the last-named means includes a loud speaker that produces sound waves according to the demodulated signals.

3. A television receiver as defined in claim 1 in which the capacity of the second-named condenser is greater than that of the first-named condenser.

4. A television receiver as defined in claim 3 in which the two resonant circuits have sufficient mutual inductance as to adequately drive the demodulating means without the interposition of an amplifier between the parallel resonant circuit and the demodulating means, the demodulating means having an in put connected directly across said parallel resonant circuit.

5. A television receiver as defined in claim 1 in which the two resonant circuits have sufficient mutual inductance as to adequately drive the demodulating means without the interposition of an amplifier between the parallel resonant circuit and the demodulating means, the demodulating means having an input connected directly across said parallel resonant circuit.

6. In a television receiver of the intercarrier type, a chassis means for producing a video signal varying within a predetermined frequency band and a frequency modulated sound channel in a band outside the band of the video signals, picture presentation means, means connecting the first and second means together and which allows the video signals to pass and substantially prevents passage of the frequency modulated sound signals, means coupled to the first-named means and which effects only very small drain of energy therefrom so far as signals in the video band are concerned and which establishes a very substantial magnetic field varying according to variations in the frequency modulated sound signal, and means including an inductor in the path of said field and driven thereby for deriving audio frequency signals from said frequency modulated sound signals, the third-named means including a low pass filter network having an inductor adjacent the picture presentation means on one side of the chassis and another inductor on the other side of the chassis, and a lead connecting said inductors whereby the capacity between the lead and the chassis forms at least a part of the capacity of the middle part of the filter network.

7. A television receiver of the intercarrier type comprising means including an amplifier for producing a video signal within a predetermined band and a frequency modulated sound channel in a band outside of said video band, a picture tube having a grid, a chassis, a double pi filter network connecting said amplifier to said grid, said network including an inductor in series with and adjacent said grid on one side of said chassis, another inductor in series with said amplifier on the other side of said chassis, and a lead connecting said inductors whereby the capacity between the lead and the chassis forms at least a part of the capacity of the middle part of the network, and separate means for extracting signals in the frequency modulated sound channel from said first-named means.

8. A television receiver as defined in claim 7 in which a condenser is connected between said lead and said chassis, the effective capacity between the lead and the chassis including the capacity of said condenser being double that between said grid and the chassis and double that between the output of the amplifier and the chassis.

References Cited in the file of this patent

UNITED STATES PATENTS 2,652,447 Crosby ---------------- Sept. 15, 1953

OTHER REFERENCES

Radio-Electronics Magazine for September 1949, pages 30–31.